United States Patent [19]

Yatka et al.

[11] Patent Number: 5,525,360
[45] Date of Patent: Jun. 11, 1996

[54] CHEWING GUM PRODUCTS USING POLYDEXTROSE

[75] Inventors: Robert J. Yatka, Orland Park; Lindell C. Richey, Lake Zurich; Marc A. Meyers, Naperville, all of Ill.

[73] Assignee: Wm. Wrigley Jr. Company, Chicago, Ill.

[21] Appl. No.: 244,844

[22] PCT Filed: Dec. 18, 1992

[86] PCT No.: PCT/US92/11018

§ 371 Date: Jul. 28, 1994

§ 102(e) Date: Jul. 28, 1994

[87] PCT Pub. No.: WO93/12665

PCT Pub. Date: Jul. 8, 1993

[51] Int. Cl.⁶ .................................................. A23G 3/30
[52] U.S. Cl. ............................ 426/3; 426/548; 426/658; 426/5
[58] Field of Search ............................. 426/3–6, 658, 426/548

[56] References Cited

U.S. PATENT DOCUMENTS

| | | | |
|---|---|---|---|
| 2,876,105 | 3/1959 | Jucaitis et al. | 426/658 |
| 3,766,165 | 10/1973 | Rennhard | 426/658 |
| 4,382,963 | 5/1983 | Klose et al. | 426/3 |
| 4,528,206 | 7/1985 | Kastin | 426/660 |
| 4,626,441 | 12/1986 | Wolkstein | 426/548 |
| 4,631,195 | 12/1986 | Colliopoulos et al. | 426/548 |
| 4,704,288 | 11/1987 | Tsau et al. | 426/99 |
| 4,765,991 | 8/1988 | Cherukuri et al. | 426/3 |
| 4,802,924 | 2/1989 | Woznicki et al. | 427/3 |
| 4,948,596 | 8/1990 | Bunick et al. | 426/3 |
| 4,988,518 | 1/1991 | Patel et al. | 426/5 |
| 5,009,900 | 4/1991 | Levine et al. | 426/96 |
| 5,059,428 | 10/1991 | Wong et al. | 426/3 |
| 5,064,658 | 11/1991 | Cherukuri et al. | 426/3 |
| 5,066,511 | 11/1991 | Cherukuri et al. | 426/658 |
| 5,084,298 | 1/1992 | Hussein et al. | 426/658 |
| 5,087,461 | 2/1992 | Levine et al. | 426/96 |
| 5,091,015 | 2/1992 | Bunick et al. | 124/30 |
| 5,098,730 | 3/1992 | Peppper et al. | 426/548 |
| 5,110,608 | 5/1992 | Cherukuri et al. | 426/3 |

FOREIGN PATENT DOCUMENTS

| | | |
|---|---|---|
| 2095567 | 11/1993 | Canada . |
| 0100002A1 | 2/1984 | European Pat. Off. . |
| 0252874A2 | 1/1988 | European Pat. Off. . |
| 0267809A2 | 5/1988 | European Pat. Off. . |
| 0398465A2 | 11/1990 | European Pat. Off. . |
| 0438912A2 | 7/1991 | European Pat. Off. . |
| 61-173748 | 8/1986 | Japan . |
| 3-20301 | 1/1991 | Japan . |
| 4-60619 | 9/1992 | Japan . |
| WO92/02149 | 2/1992 | WIPO . |
| WO92/08370 | 5/1992 | WIPO . |
| WO92/10168 | 6/1992 | WIPO . |
| WO92/12179 | 7/1992 | WIPO . |
| WO93/12665 | 7/1993 | WIPO . |

OTHER PUBLICATIONS

Brochure entitled, "Litesse" by Pfizer, 11 pages, published before Feb. 1991.

Article titled, "Polydextrose," printed in *Food Processing*, pp. 29–30, Apr. 1984.

Article titled, "Sweeteners 4. Applications of Polydextrose," printed in *Food Technology*, Jan. 1986, pp. 129–130.

*Primary Examiner*—Jeanette Hunter
*Attorney, Agent, or Firm*—Steven P. Shurtz; Willian Brinks Hofer Gilson & Lione

[57] ABSTRACT

Chewing gum products containing polydextrose and methods of making such products are disclosed. In one embodiment, the polydextrose is used in a rolling compound applied to the chewing gum product. In a second embodiment, the polydextrose is used in a hard-shell coating for a pellet gum. In a third embodiment, polydextrose is used in the center fill of a chewing gum. Polydextrose is also co-dried with other sweeteners, coevaporated to make syrups and used as an encapsulating agent for high-intensity sweeteners or flavors used in gum compositions.

23 Claims, 5 Drawing Sheets

CHEWING GUM PRODUCTS USING POLYDEXTROSE

CROSS REFERENCE TO RELATED APPLICATION

The present application is a continuation-in-part of U.S. application Ser. No. 91/09631 filed as a PCT application on Dec. 20, 1991. That application, published as PCT Publication No. WO92/08370, is incorporated herein by reference.

BACKGROUND OF THE INVENTION

The present invention relates to improved compositions of chewing gum. More particularly, the invention relates to improving chewing gum by the use of specific bulking agents in sugar and non-sugar chewing gum products to give improved texture, moisture absorption properties, and improved shelf life properties. The improved chewing gum compositions may also be used in a variety of chewing gum products such as confectionery coated chewing gum products.

In recent years, efforts have been devoted to replace sugar and sugar syrups normally found in chewing gum with other carbohydrates and noncarbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture and shelf life properties of chewing gum for consumers.

The non-sugar polyols have the advantage of not contributing to dental caries of consumers, as well as being able to be consumed by diabetics. However, all polyols have the disadvantage of causing gastrointestinal disturbances if consumed in too great of a quantity. Therefore it would be a great advantage to be able to use a carbohydrate or carbohydrate-like food ingredient for chewing gum that would act as a bulking agent, but not contribute to dental caries nor cause as severe gastrointestinal disturbances.

One such bulking agent is called polydextrose. This bulking agent or bulk sweetener is approved for use in human food products and in chewing gum in the U.S. Polydextrose is also approved in countries in Europe and in Japan. Polydextrose is a randomly bonded condensation "recombined" polymer of dextrose containing minor amounts of bound sorbitol and citric acid. Although a carbohydrate, polydextrose does not contribute to dental caries, does not cause as significant gastrointestinal disturbances as polyols, and does not significantly contribute to calories.

In 1973, Pfizer, Inc. of New York disclosed the manufacture of unique polyglucose compounds (polydextrose) and their method of preparation in U.S. Pat. No. 3,766,165.

The use of polydextrose has been disclosed in various food products in EPO Patent Publication No. 0 438 912, U.S. Pat. No. 4,802,924, U.S. Pat. No. 4,528,206, U.S. Pat. No. 5,009,900, U.S. Pat. No. 4,626,441, U.S. Pat. No. 5,084,298 and U.S. Pat. No. 5,098,730. In addition, U.S. Pat. No. 4,631,195 discloses a sweetening composition using polydextrose to stabilize aspartame against heat degredation.

The use of polydextrose has also been disclosed in chewing gum formulations in EPO Patent Publication No. 0 252 874, U.S. Pat. No. 4,765,991, EPO Patent Publication No. 0 398 465, U.S. Pat. No. 5,066,511, Japanese Patent Publication No. 86-173748, U.S. Pat. No. 4,382,963, U.S. Pat. No. 5,059,428 and U.S. Pat. No. 5,110,608. Some of these patents disclose examples using polydextrose and a high-intensity sweetener, such as aspartame.

When polydextrose was first introduced into the market, the product had low flavor quality. As a result, several patents disclosed methods of improving its quality. These are Japanese Patent Publication No. 91-20301 and U.S. Pat. No. 4,948,596.

Pfizer, Inc. of New York has recently introduced a premium version of polydextrose that has improved flavor quality and is marketing polydextrose under the tradename "Litesse."

SUMMARY OF THE INVENTION

Chewing gum products using polydextrose and methods of making such gum products have been invented. In one embodiment, the polydextrose is used in a rolling compound applied to the chewing gum product. In a second embodiment, the polydextrose is used in a hard-shell coating for a pellet gum. In a third embodiment, polydextrose is used in a centerfill of a chewing gum product. In a fourth embodiment, aspartame is used to sweeten the gum composition and the polydextrose is provided in an effective amount to stabilize the aspartame such that after eight weeks of storage at 85° F., at least 5% less aspartame decomposes than would have decomposed if the polydextrose was not included. Polydextrose is also used as an encapsulating agent for high-intensity sweeteners or flavors used in gum compositions. In yet another embodiment, polydextrose is co-dried from a solution with another sweetener selected from the group consisting of sugar sweetener, alditol sweeteners and high-intensity sweeteners and used in a gum composition. In still another embodiment, polydextrose and a plasticizing agent are coevapoarated to form a syrup that is used in a gum composition.

This sweetener, polydextrose, when used according to the present invention, gives chewing gum an improved texture, an improved shelf life and unique flavor/sweetness quality. Even though polydextrose has properties similar to sucrose, it is not cariogenic, contributes to dietary fiber and does not significantly contribute to calories, giving a highly consumer-acceptable chewing gum product.

DETAILED DESCRIPTION OF THE DRAWINGS AND PREFERRED EMBODIMENTS OF THE INVENTION

Figure 1:
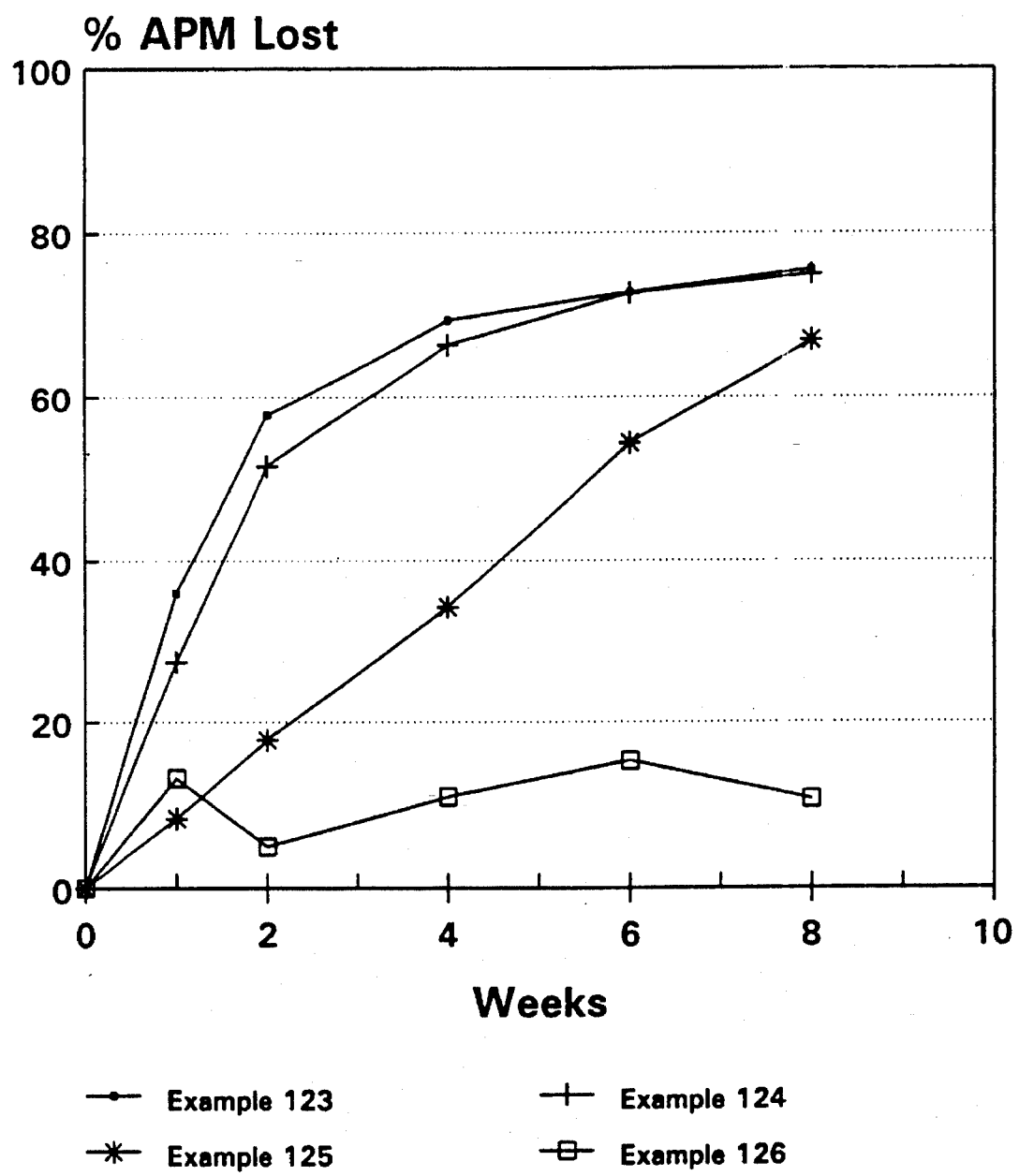
FIG. 1 shows test results of aspartame stability for gum made with polydextrose.

As used herein, the term "chewing gum" also includes bubble gum and the like. Unless otherwise specified, all percentage used herein are weight percents.

Polydextrose is a randomly bonded condensation polymer of dextrose containing minor amounts of bound sorbitol and citric acid. It is partially metabolized, resulting in a caloric utilization of about one calorie per gram. Polydextrose is commercially available from Pfizer, Inc. of New York, N.Y. under the tradename "Litesse." Litesse is a water soluble, white-to-cream colored amorphous powder. It forms a clear melt above 130° C. in a manner similar to sucrose. A 10% solution has a pH of 2.5 to 3.5.

Polydextrose may be used in food as a multipurpose food additive in accordance with the US FDA. The regulation defines polydextrose as a partially metabolizable water soluble polymer prepared from D-glucose with small amounts of sorbitol and citric acid. Polydextrose is currently approved in the United States as a food ingredient for: frozen dairy desserts, baked goods and mixes, confections and frostings, salad dressings, gelatins, puddings and pie fillings, hard candy and soft candy, and chewing gum. No maximum use level has been established by the FDA.

Polydextrose is also approved by the following European nations: Austria, Belgium, Denmark, Finland, France, Ireland, the Netherlands, Norway, Sweden, Switzerland and the UK. The Litesse brand of polydextrose is recognized as safe by the European Scientific Committee for Foods. In Japan, polydextrose is considered a food and confirmed as safe, and may be used as a dietary fiber. It has also been confirmed that polydextrose has a caloric utilization of one calorie per gram, compared to four calories per gram for conventional sugars and carbohydrates.

Polydextrose has been developed by Pfizer, Inc. and several forms have been available. The original polydextrose was called polydextrose A. However, it contained some citric acid, which gave it a poor quality taste. To improve the taste, polydextrose K was developed, where the citric acid was neutralized with potassium bicarbonate. A liquid syrup version of polydextrose K was also available called polydextrose Type N at 70% solids. A further improved version of polydextrose has now been developed by Pfizer, Inc. where citric acid is significantly reduced and taste is improved. This polydextrose has the tradename of Litesse. Currently only polydextrose A, Litesse and a recently improved Litesse called Litesse II are commercially available. All of these materials have similar properties and are referred to herein generically as polydextrose.

Polydextrose may be added to chewing gum in its solid form or dissolved in syrup form. Its solubility in water is about 70% at room temperature, but increases with increased temperature. Polydextrose may be used in chewing gum as a texture and flavor modifier, bulking agent, and may improve texture, flavor, and shelf life properties. Polydextrose may replace solids like sucrose, dextrose or lactose when used in its powder form, or may replace syrups when used in its liquid or syrup form. At levels of about 0.5% to about 25%, polydextrose may replace part of the solids in sugar gum or, as a liquid, all or part of the syrup in sugar gum. At higher levels of about 25% to about 90% of the gum formulation, polydextrose may replace all of the solids in a chewing gum formulation.

In its powder or liquid form, a sufficient quantity of polydextrose can stabilize aspartame. At levels above 10%, polydextrose may replace significant quantities of sucrose and syrup. Because of the resulting lower sweetness, aspartame may be added. It has been found that aspartame is stabilized with polydextrose, especially when the polydextrose is used at a level of 10% or more of the gum. In preferred embodiments, an effective amount of polydextrose is used in gums with sweetness imparting amounts of aspartame to stabilize the aspartame against decomposition during storage at 85° F. for eight weeks whereby at least 5% less aspartame decomposes into non-sweetening derivatives than would have decomposed if the polydextrose was not included in the gum composition. Because aspartame has such high potency and is used at such low levels, and because of its high cost, even a 5% reduction in degradation is a significant benefit. While the aspartame contemplated will generally be unencapsulated, the term "unencapsulated" as used herein applies to aspartame which, even if treated or partially encapsulated, is still subject to some degradation in the gum formulation.

Although polydextrose has properties like sucrose, its anti-caries properties suggest it may be used in chewing gum formulations containing non-sugar ingredients. Non-sugar ingredients are alditols such as sorbitol, mannitol, xylitol, lactitol, palatinit (hydrogenated isomaltulose), maltitol and hydrogenated starch hydrolyzates. These alditols are used in a variety of combinations to develop unique sugarless chewing gum formulations. Polydextrose may be used to replace the individual alditols or combinations of alditols. With partial replacement of one or more alditols, polydextrose can be used at levels of about 0.5–25%. If polydextrose replaces a large amount or most of the alditols, this level may be about 25% to about 90% of the gum formulation.

Some sugar-free chewing gum formulations contain high levels of glycerin and are very low in moisture, i.e., less than about 2%. Polydextrose as a powder or liquid may replace part or all of the glycerin used in these types of formulations. At higher moisture levels (more than 2%) in sugar-free gum, a sorbitol liquid (70% sorbitol, 30% water) is used. When using polydextrose, preferably sorbitol liquid may also be used to obtain soft textured gum formulations. Previous high moisture formulations containing sorbitol liquid were not made with aspartame, since the moisture caused degradation of aspartame. However, when sufficient polydextrose (generally greater than about 10%) is added to a high moisture gum, aspartame is stabilized, and degradation is reduced or eliminated.

Recent advances use hydrogenated starch hydrolyzates (HSH) and glycerin preblended and co-evaporated to reduce moisture in some sugar-free gum formulations. Polydextrose may be used to replace part or all of the HSH/glycerin blends in such chewing gum formulations. Aqueous polydextrose solids and/or polydextrose syrup may also replace HSH in the preblend with glycerin and be co-evaporated with glycerin to obtain a low moisture, non-crystallizable blend. Combinations of polydextrose solids/syrup with alditols like sorbitol, maltitol, xylitol, lactitol and mannitol in aqueous form may also be blended with glycerin and co-evaporated for use in low-moisture, sugar-free gum.

Polydextrose may be used in gum formulations with hydrogenated starch hydrolyzates (HSH) without preblending with glycerin and coevaporation. Low levels of moisture are not necessary to prevent degradation of aspartame when polydextrose is used, so HSH syrups at about 20–30% moisture do not need to be modified to reduce moisture to improve aspartame stability.

In a similar manner, polydextrose solids/syrup preblended in glycerin and co-evaporated may be used in conventional sugar chewing gum formulations. Polydextrose may be combined with other sugars like dextrose, sucrose, lactose, maltose, invert sugar, fructose and corn syrup solids to form a liquid mix to be blended with glycerin and co-evaporated. Polydextrose solids/syrup may also be mixed with conventional syrup and blended with glycerin and co-evaporated for use in a sugar chewing gum formulation.

Polydextrose bulk sweetener may be co-dried with a variety of sugars such as sucrose, dextrose, lactose, fructose and corn syrup solids and used in a sugar-containing gum formulation. Polydextrose may also be co-dried with a variety of alditols, such as sorbitol, mannitol, xylitol, maltitol, palatinit and hydrogenated starch hydrolyzates, and used in a sugar-free gum formulation. Co-drying refers to methods of co-crystallization and co-precipitation of polydextrose with other sugars and alditols, as well as co-drying by encapsulation, agglomeration and absorption with other sugars and alditols.

Co-drying by encapsulation, agglomeration and absorption can also include the use of encapsulating and agglomerating agents. Polydextrose may be mixed with other sugars or alditols prior to being redried by encapsulation or agglomeration, or may be used alone with the encapsulating and agglomerating agents. These agents modify the physical properties of the bulk sweetener and control its release from chewing gum. Since polydextrose is highly soluble in water as noted earlier, controlling the release of polydextrose modifies the texture and flavor of the chewing gum.

The three methods of use to obtain a delayed release of bulk sweetener are: (1) encapsulation by spray drying, fluid-bed coating, spray chilling and coacervation to give full or partial encapsulation, (2) agglomeration to give partial encapsulation and (3) fixation or entrapment/absorption which also gives partial encapsulation. These three methods, combined in any usable manner which physically isolates the bulk sweetener, reduces its dissolvability or slows down the release of bulk sweetener, are included in this invention.

Polydextrose may act as an encapsulating or agglomerating agent. Polydextrose may also be used to absorb other ingredients. Polydextrose may be able to encapsulate, agglomerate or entrap/absorb flavors and high-intensity sweeteners like aspartame, alitame, cyclamic acid and its salts, saccharin acid and its salts, acesulfame and its salts, sucralose, dihydrochalcones, thaumatin, monellin or combinations thereof. Encapsulation of high-intensity sweeteners with polydextrose may improve the sweetener's shelf life.

Polydextrose may be used with other bulk sweeteners and in combination give unique properties. Polydextrose may be co-dried by various delayed release methods noted above with other bulk sweeteners like palatinose, sucrose, dextrose, lactose, maltose, fructose, corn syrup solids, sorbitol, mannitol, xylitol, maltitol, palatinit and hydrogenated starch hydrolyzates for use in sugar and sugar-free chewing gum. Ingredients, including flavors, co-dried, encapsulated, agglomerated or absorbed on polydextrose may show faster release. However, encapsulation of flavors with polydextrose may improve the shelf-life of the flavor ingredient like other bulking agents.

Other methods of treating the polydextrose bulk sweetener to physically isolate the sweetener from other chewing gum ingredients may also have some effect on its release rate and its effect on chewing gum flavor and texture. The bulk sweetener may be added to the liquid inside a liquid center gum product. The center fill of a gum product may comprise one or more carbohydrate syrups, glycerin, thickeners, flavors, acidulants, colors, sugars and sugar alcohols in conventional amounts. The ingredients are combined in a conventional manner. The bulk sweetener is dissolved in the center-fill liquid and the amount of bulk sweetener added to the center-fill liquid may be about 0.1% to about 20% by weight of the entire chewing gum formula. This method of using polydextrose bulk sweetener in chewing gum can allow for a lower usage level of the bulk sweetener, can give the bulk sweetener a smooth release rate, and can reduce or eliminate any possible reaction of the bulk sweetener with gum base, flavor components or other components, yielding improved shelf stability.

Another method of isolating the polydextrose bulk sweetener from other chewing gum ingredients is to add polydextrose to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored. The rolling compound comprises polydextrose bulk sweetener alone or in combination with mannitol, sorbitol, sucrose, starch, calcium carbonate, talc, other orally acceptable substances or a combination thereof. The rolling compound constitutes from about 0.25% to about 10.0%, but preferably about 1% to about 3% of weight of the chewing gum composition. The amount of polydextrose bulk sweetener added to the rolling compound is about 0.5% to 100% of the rolling compound, or about 0.005% to about 5% of the chewing gum composition. This method of using polydextrose bulk sweetener in the chewing gum can allow a lower usage level of the bulk sweetener, can give the bulk sweetener a more controlled release rate, and can reduce or eliminate any possible reaction of the bulk sweetener with gum base, flavor components or other components, yielding improved shelf stability.

Another method of isolating polydextrose bulk sweetener is to use it in the coating/panning of a pellet chewing gum to obtain a hard-shell coating. Pellet or ball gum is prepared as conventional chewing gum, but formed into pellets that are pillow shaped or into balls. The pellets/balls can then be sugar coated or panned by conventional panning techniques to make a unique sugar-coated pellet gum. Conventional panning procedures generally apply a liquid coating to a pellet, which is then solidified, usually by drying the coating. The hard-shell coating layer is built up by successive coating and drying steps.

The bulk sweetener is very stable and highly water soluble, and can be easily added to a sugar solution prepared for sugar panning. Polydextrose may be added in a liquid form to the sucrose coating or any other sugar or alditol coating. Polydextrose can also be added as a powder blended with other powders often used in some types of conventional panning procedures. Using polydextrose bulk sweetener isolates the sweetener from other gum ingredients and modifies its release rate in chewing gum. Levels of use of polydextrose may be about 1% to about 20% in the coating and about 0.5% to about 10% of the weight of the chewing gum product. The weight of the coating may be about 20% to about 50% of the weight of the finished gum product.

Conventional panning procedures generally coat with sucrose, but recent advances in panning have allowed the use of other carbohydrate materials to be used in the place of sucrose, yet still obtain a hard-shell coating. Some of these components include, but are not limited to, dextrose, maltose, xylitol, lactitol, palatinit and other new alditols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum, and gum tragacanth, insoluble carbonates like calcium carbonate or magnesium carbonate, and talc. Polydextrose also acts as a panning modifier with other panning materials to improve product quality. Antitack agents may also be added as panning modifiers, which allow the use of a variety of carbohydrates and sugar alcohols to be used in the development of new panned or coated gum products. Flavors may also be added with the sugar coating and with the polydextrose bulk sweetener to yield unique product characteristics.

Another method to improve coating processes using sugars or alditols is to add a powder coating after a liquid coating. The powder coating may include polydextrose, maltodextrin, gelatin, cellulose derivatives, starches, modified starches, vegetable gums and fillers like talc and calcium carbonate. This will reduce stickiness and allow a faster build-up of coating.

Polydextrose may be added to the liquid syrup and used as a panning modifier with other sugar and sugar alcohol syrups such as dextrose, sucrose, xylitol and palatinit. Polydextrose may act as a binder to, and film former for, the sugar or sugar alcohol coating.

The previously described polydextrose bulk sweetener may readily be incorporated into a chewing gum composition. The remainder of the chewing gum ingredients are noncritical to the present invention. That is, the untreated or coated particles of bulk sweetener can be incorporated into conventional chewing gum formulations in a conventional manner. The polydextrose bulk sweeteners may be used in a sugar-free or sugar chewing gum to modify the sweetness thereof. The bulk sweetener may be used in either regular chewing gum or bubble gum. Higher levels of polydextrose will reduce sweetness, thus allowing for its use in non-sweet flavored chewing gums such as snack flavors and savory flavors.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and Polydextrose may be added to the liquid syrup and used as a panning modifier with other sugar and sugar alcohol syrups such as dextrose, sucrose, xylitol and palatinit. Polydextrose may act as a binder to, and film former for, the sugar or sugar alcohol coating.

The previously described polydextrose bulk sweetener may readily be incorporated into a chewing gum composition. The remainder of the chewing gum ingredients are noncritical to the present invention. That is, the untreated or coated particles of bulk sweetener can be incorporated into conventional chewing gum formulations in a conventional manner. The polydextrose bulk sweeteners may be used in a sugar-free or sugar chewing gum to modify the sweetness thereof. The bulk sweetener may be used in either regular chewing gum or bubble gum. Higher levels of polydextrose will reduce sweetness, thus allowing for its use in non-sweet flavored chewing gums such as snack flavors and savory flavors.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. The sweeteners often fill the role of bulking agents in the gum. The bulking agents generally comprise from about 5% to 90%, preferably from about 20% to about 80%, and most preferably about 30% to about 60% of the gum.

Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin and combinations thereof. Further, aqueous sweetener solutions such as those containing sorbitol, hydrogenated starch hydrolyzates, corn syrup and combinations thereof may be used as softeners and binding agents in gum.

As mentioned above, the polydextrose solids/syrup bulk sweetener of the present invention will most likely be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The polydextrose solids/syrup bulk sweetener of the present invention can also be used in combination with sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular sweetness release profile and shelf-stability needed, the polydextrose solid/syrup bulk sweeteners of the present invention can also be used in combination with coated or uncoated high-intensity sweeteners or with high-intensity sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

The formulas listed in Table 1 comprise various sugar-type formulas in which polydextrose can be added to gum after it is dissolved in water and mixed with various aqueous solvents. Aspartame (APM), which is stabilized with polydextrose, may also be added to the formula. Generally, APM is added to the gum at a level of about 0.005% to about 1% of the gum composition.

TABLE 1

|  | EX. 1 | EX. 2 | EX. 3 | EX. 4 | EX. 5 | EX. 6 | EX. 7 | EX. 8 |
| --- | --- | --- | --- | --- | --- | --- | --- | --- |
| SUGAR | 55.6 | 56.6 | 55.6 | 47.0 | 53.0 | 53.0 | 55.5 | 47.0 |
| BASE | 19.2 | 19.2 | 19.2 | 19.2 | 19.2 | 19.2 | 19.2 | 19.2 |
| CORN SYRUP | 12.8 | 1.8 | 8.8 | 2.8 | 6.8 | 6.8 | 0.0 | 2.8 |
| PEPPERMINT FLAVOR | 0.9 | 0.9 | 0.9 | 0.9 | 0.9 | 0.9 | 0.9 | 0.9 |
| GLYCERIN | 1.4 | 1.4 | 1.4 | 0.0 | 0.0 | 0.0 | 1.4 | 0.0 |
| LIQUID/ LITESSE BLEND | 10.0 | 20.0 | 14.0 | 30.0 | 20.0 | 20.0 | 22.9 | 30.0 |
| APM | 0.1 | 0.1 | 0.1 | 0.1 | 0.1 | 0.1 | 0.1 | 0.1 |

EXAMPLE 1

Litesse powder can be added directly to the gum.

EXAMPLE 2

A 100 gram portion of Litesse can be dissolved in 100 grams of water at 40° C. making a 50% solution and added to gum.

EXAMPLE 3

Litesse syrup at 70% solids can be added directly to the gum.

EXAMPLE 4

A blend of 80 grams of Litesse and 120 grams of water is mixed at 40° C. To this is added 100 grams of glycerin to give a mixture of 27% Litesse, 40% water and 33% glycerin, and added to gum.

EXAMPLE 5

To 140 grams of Litesse syrup at 70% solids is added 60 grams of glycerin to give a 70% Litesse syrup with 30% glycerin, and added to gum.

EXAMPLE 6

To 140 grams of Litesse syrup of 70% solids is added 60 grams of propylene glycol giving a 70% Litesse syrup with 30% propylene glycol and added to gum.

EXAMPLE 7

To 140 grams of Litesse syrup at 70% solids is added 89 grams of corn syrup and blended, giving a mixture of 61% Litesse syrup and 39% corn syrup.

EXAMPLE 8

To a 200 gram quantity of corn syrup is added 100 grams of glycerin. To this mixture is added 75 grams of Litesse and blended at 50° C. This mixture is added to gum.

In the next examples of sugar gum formulations, polydextrose can be dissolved in water and emulsifiers can be added to the aqueous solution. Example solutions can be prepared by dissolving 15 grams of polydextrose in 70 grams water and adding 15 grams of emulsifiers of various hydrophilic-lipophilic balance (HLB) values to the solution. The mixtures can then be used in the following formulas. (Note: the solution of Example 9 does not contain any emulsifier.)

TABLE 2

|  | EX. 9 | EX. 10 | EX. 11 | EX. 12 | EX. 13 | EX. 14 |
|---|---|---|---|---|---|---|
| SUGAR | 50.7 | 50.7 | 50.7 | 50.7 | 50.7 | 50.7 |
| BASE | 19.2 | 19.2 | 19.2 | 19.2 | 19.2 | 19.2 |
| CORN SYRUP | 12.8 | 12.8 | 12.8 | 12.8 | 12.8 | 12.8 |
| GLYCERIN | 1.4 | 1.4 | 1.4 | 1.4 | 1.4 | 1.4 |
| DEXTROSE MONOHYDRATE | 9.9 | 9.9 | 9.9 | 9.9 | 9.9 | 9.9 |
| PEPP. FLAVOR | 0.9 | 0.9 | 0.9 | 0.9 | 0.9 | 0.9 |
| APM | 0.1 | 0.1 | 0.1 | 0.1 | 0.1 | 0.1 |
| BULK SWEETENER/ EMULSIFIER/WATER MIXTURE | 5.0 | 5.0 | 5.0 | 5.0 | 5.0 | 5.0 |
|  | None | HLB = 2 | HLB = 4 | HLB = 6 | HLB = 9 | HLB = 12 |

EXAMPLES 15–20

The same as the formulations made in Examples 9–14, respectively, except that the flavor can be mixed together with the aqueous bulk sweetener solution and emulsified before adding the mixture to the gum batch.

The following Tables 3 through 10 give examples of gum formulations that demonstrate formula variations in which polydextrose, in the form of polydextrose A, polydextrose K, polydextrose N 70% syrup and Litesse brand polydextrose, may be used. Formulas with high levels of polydextrose may also contain aspartame (APM), which is stabilized with polydextrose.

Examples 21–25 in Table 3 demonstrate the use of polydextrose in low-moisture sugar formulations showing less than 2% theoretical moisture:

TABLE 3

|  | EX. 21 | EX. 22 | EX. 23 | EX. 24 | EX. 25 |
|---|---|---|---|---|---|
| SUGAR | 57.9 | 53.9 | 46.9 | 23.0 | 0.0 |
| GUM BASE | 19.2 | 19.2 | 19.2 | 19.2 | 19.2 |
| CORN[a] SYRUP | 6.0 | 6.0 | 6.0 | 6.0 | 4.0 |
| DEXTROSE MONOHYDRATE | 10.0 | 10.0 | 10.0 | 10.0 | 10.0 |
| LACTOSE | 0.0 | 0.0 | 0.0 | 5.0 | 5.0 |
| GLYCERIN[b] | 5.0 | 5.0 | 6.9 | 10.7 | 10.6 |
| FLAVOR | 0.9 | 0.9 | 0.9 | 0.9 | 0.9 |
| LITESSE | 1.0 | 5.0 | 10.0 | 25.0 | 50.0 |
| APM | — | — | 0.1 | 0.2 | 0.3 |

[a]Corn syrup is evaporated to 85% solids, 15% moisture
[b]Glycerin and syrup may be blended and co-evaporated Examples 26–30 in Table 4 demonstrate the use of polydextrose in medium-moisture sugar formulations having about 2% to about 5% moisture.

TABLE 4

|  | EX. 26 | EX. 27 | EX. 28 | EX. 29 | EX. 30 |
|---|---|---|---|---|---|
| SUGAR | 52.5 | 46.5 | 40.5 | 20.0 | 0.0 |
| GUM BASE | 19.2 | 19.2 | 19.2 | 19.2 | 19.2 |
| CORN SYRUP[a] | 15.0 | 15.0 | 14.9 | 18.3 | 18.2 |
| DEXTROSE MONOHYDRATE | 10.0 | 10.0 | 10.0 | 10.0 | 5.0 |
| GLYCERIN[b] | 1.4 | 3.4 | 4.4 | 6.4 | 6.4 |
| FLAVOR | 0.9 | 0.9 | 0.9 | 0.9 | 0.9 |
| LITESSE | 1.0 | 5.0 | 10.0 | 25.0 | 50.0 |
| APM | — | — | 0.1 | 0.2 | 0.3 |

[a]Corn syrup is evaporated to 85% solids, 15% moisture
[b]Glycerin and syrup may be blended and co-evaporated Examples 31–35 in Table 5 demonstrate the use of polydextrose in high-moisture sugar formulations having more than about 5% moisture.

TABLE 5

|  | EX. 31 | Ex. 32 | EX. 33 | EX. 34 | EX. 35 |
|---|---|---|---|---|---|
| SUGAR | 50.0 | 44.0 | 38.0 | 20.0 | 0.0 |
| GUM BASE | 24.0 | 24.0 | 24.0 | 24.0 | 24.0 |
| CORN SYRUP | 24.0 | 24.0 | 24.0 | 24.4 | 19.3 |
| GLYCERIN | 0.0 | 2.0 | 2.9 | 5.4 | 5.4 |
| FLAVOR | 1.0 | 1.0 | 1.0 | 1.0 | 1.0 |
| LITESSE | 1.0 | 5.0 | 10.0 | 25.0 | 50.0 |
| APM | — | — | 0.1 | 0.2 | 0.3 |

Examples 36–40 in Table 6 and Examples 41–50 in Tables 7 and 8 demonstrate the use of polydextrose in low- and high-moisture gums that are sugar-free. Low-moisture gums have less than about 2% moisture, and high-moisture gums have greater than 2% moisture.

TABLE 6

|  | EX. 36 | EX. 37 | EX. 38 | EX. 39 | EX. 40 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| MANNITOL | 12.0 | 12.0 | 12.0 | 12.0 | 13.0 |
| GLYCERIN | 10.0 | 9.9 | 9.8 | 9.7 | 9.6 |
| FLAVOR | 1.5 | 1.5 | 1.5 | 1.5 | 1.5 |
| LITESSE | 1.0 | 5.0 | 10.0 | 25.0 | 50.0 |
| APM | — | 0.1 | 0.2 | 0.3 | 0.4 |

TABLE 7

|  | EX. 41 | EX. 42 | EX. 43 | EX. 44 | EX. 45 |
|---|---|---|---|---|---|
| BASE | 25.5 | 25.5 | 25.5 | 25.5 | 25.5 |
| SORBITOL | 50.0 | 46.0 | 39.0 | 23.0 | 0.0 |
| SORBITOL LIQUID* | 10.0 | 10.0 | 10.0 | 10.0 | 11.0 |
| MANNITOL | 10.0 | 10.0 | 10.0 | 10.0 | 5.0 |
| GLYCERIN | 2.0 | 1.9 | 3.8 | 4.7 | 6.6 |
| FLAVOR | 1.5 | 1.5 | 1.5 | 1.5 | 1.5 |
| LITESSE | 1.0 | 5.0 | 10.0 | 25.0 | 50.0 |
| APM | — | 0.1 | 0.2 | 0.3 | 0.4 |

*Sorbitol liquid contains 70% sorbitol, 30% water

TABLE 8

|  | EX. 46 | EX. 47 | EX. 48 | EX. 49 | EX. 50 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| HSH SYRUP* | 10.0 | 10.0 | 10.0 | 10.0 | 10.0 |
| MANNITOL | 8.0 | 7.9 | 7.8 | 7.7 | 8.6 |
| GLYCERIN** | 4.0 | 4.0 | 4.0 | 4.0 | 4.0 |

TABLE 8-continued

|  | EX. 46 | EX. 47 | EX. 48 | EX. 49 | EX. 50 |
|---|---|---|---|---|---|
| FLAVOR | 1.5 | 1.5 | 1.5 | 1.5 | 1.5 |
| LITESSE | 1.0 | 5.0 | 10.0 | 25.0 | 50.0 |
| APM | — | 0.1 | 0.2 | 0.3 | 0.4 |

*Lycasin brand hydrogenated starch hydrolyzate syrup
**Glycerin and HSH syrup may be blended or co-evaporated Table 9 shows sugar chewing gum formulations that can be made with polydextrose and various other types of sugars.

TABLE 9

|  | EX. 51 | EX. 52 | EX. 53 | EX. 54 | EX. 55 | EX. 56 |
|---|---|---|---|---|---|---|
| GUM BASE | 19.2 | 19.2 | 19.2 | 19.2 | 19.2 | 19.2 |
| SUCROSE | 44.4 | 21.2 | 39.4 | 16.2 | 29.4 | 16.2 |
| GLYCERIN | 1.4 | 4.4 | 1.4 | 4.4 | 1.4 | 4.4 |
| CORN SYRUP | 14.0 | 14.0 | 14.0 | 14.0 | 14.0 | 14.0 |
| DEXTROSE | 5.0 | 5.0 | — | — | 10.0 | 5.0 |
| LACTOSE | 5.0 | 5.0 | 10.0 | 10.0 | — | — |
| FRUCTOSE | 5.0 | 5.0 | 10.0 | 10.0 | 10.0 | 5.0 |
| INVERT SUGAR | — | — | — | — | 10.0 | 10.0 |
| MALTOSE | — | — | — | — | — | — |
| CORN SYRUP SOLIDS | — | — | — | — | — | — |
| PEPPERMINT FLAVOR | 0.9 | 0.9 | 0.9 | 0.9 | 0.9 | 0.9 |
| LITESSE | 5.0 | 25.0 | 5.0 | 25.0 | 5.0 | 25.0 |
| APM | 0.1 | 0.3 | 0.1 | 0.3 | 0.1 | 0.3 |

|  | EX. 57 | EX. 58 | EX. 59 | EX. 60 | EX. 61 | EX. 62 |
|---|---|---|---|---|---|---|
| GUM BASE | 19.2 | 19.2 | 19.2 | 19.2 | 19.2 | 19.2 |
| SUCROSE | 29.4 | 16.2 | 29.4 | 16.2 | 37.4 | 19.2 |
| GLYCERIN | 1.4 | 4.4 | 1.4 | 4.4 | 1.4 | 4.4 |
| CORN SYRUP | 14.0 | 14.0 | 14.0 | 14.0 | 11.0 | 11.0 |
| DEXTROSE | 10.0 | 5.0 | 10.0 | 5.0 | 10.0 | 5.0 |
| LACTOSE | — | — | — | — | — | — |
| FRUCTOSE | 10.0 | 5.0 | 10.0 | 5.0 | 5.0 | 5.0 |
| INVERT SUGAR | 10.0 | 10.0 | — | — | 5.0 | 5.0 |
| MALTOSE | — | — | 10.0 | 10.0 | — | — |
| CORN SYRUP SOLIDS | — | — | — | — | 5.0 | 5.0 |
| PEPPERMINT FLAVOR | 0.9 | 0.9 | 0.9 | 0.9 | 0.9 | 0.9 |
| LITESSE | 5.0 | 25.0 | 5.0 | 25.0 | 5.0 | 25.0 |
| APM | 0.1 | 0.3 | 0.1 | 0.3 | 0.1 | 0.3 |

Any of the sugars may be combined with polydextrose and co-dried to form unique combinations such as:

EXAMPLE 63

Dextrose and Litesse can be dissolved in water in a 2:1 ratio of dextrose:Litesse and co-dried or co-precipitated and used in the formulas in Table 9.

EXAMPLE 64

Litesse and sucrose can be dissolved in water in a 1:1 ratio and co-dried or co-precipitated and used in the formulas in Table 9.

EXAMPLE 65

Litesse, sucrose and dextrose can be dissolved in water in a 1:1:1 ratio and co-dried or co-precipitated and used in the formulas in Table 9.

EXAMPLE 66

Litesse, sucrose, dextrose and fructose can be dissolved in water at 25% of each ingredient and co-dried, and used in the formulas in Table 9.

EXAMPLE 67

Litesse, dextrose, fructose and lactose can be dissolved in water at 25% of each ingredient and co-dried, and used in the formulas in Table 9.

EXAMPLE 68

Litesse, dextrose, maltose and corn syrup solids can be dissolved in water at 25% of each ingredient and co-dried, and used in the formulas in Table 9.

EXAMPLE 69

Litesse, sucrose, dextrose, maltose and fructose can be dissolved in water at 20% of each ingredient and co-dried, and used in the formulas in Table 9.

Multiple combinations of polydextrose with other sugars can be made in solution to form liquid concentrates that do not need to be co-dried, such as:

EXAMPLE 70

Litesse, corn syrup and glycerin can be dissolved in water at a ratio of 1:1:1, evaporated to a thick syrup and used in the formulas in Table 9.

EXAMPLE 71

Litesse, dextrose, fructose and invert syrup may be dissolved in water at 25% of each ingredient and evaporated to a thick syrup and used in the formulas in Table 9.

EXAMPLE 72

Litesse, dextrose, maltose and corn syrup solids may be dissolved in water at 25% of each component and evaporated to a thick syrup and used in the formulas in Table 9.

EXAMPLE 73

Glycerin is added to Example 71 at a ratio of 4:1 syrup to glycerin and evaporated to a thick syrup, and used in the formulas in Table 9.

EXAMPLE 74

Glycerin is added to Example 72 at a ratio of 2:1 syrup to glycerin and evaporated to a thick syrup, and used in the formulas in Table 9.

Table 10 shows chewing gum formulations that are free of sugar. These formulations can use a wide variety of other non-sugar alditols.

TABLE 10

|  | EX. 75 | EX. 76 | EX. 77 | EX. 78 | EX. 79 | EX. 80 |
|---|---|---|---|---|---|---|
| GUM BASE | 25.5 | 25.5 | 25.5 | 25.5 | 25.5 | 25.5 |

TABLE 10-continued

| | | | | | | |
|---|---|---|---|---|---|---|
| GLYCERIN | 1.9 | 3.7 | 1.9 | 3.7 | 1.9 | 4.7 |
| SORBITOL | 44.0 | 12.0 | 34.0 | 7.0 | 28.0 | — |
| MANNITOL | — | 10.0 | 10.0 | 10.0 | 10.0 | 3.0 |
| SORBITOL LIQUID | 17.0 | 17.0 | — | — | — | — |
| LYCASIN HSH SYRUP | — | — | 17.0 | 12.0 | 8.0 | 10.0 |
| MALTITOL | — | — | — | 10.0 | — | — |
| XYLITOL | — | — | — | — | 15.0 | 15.0 |
| LACTITOL | — | — | — | — | — | — |
| PALATINIT | — | — | — | — | — | — |
| FLAVOR | 1.5 | 1.5 | 1.5 | 1.5 | 1.5 | 1.5 |
| LITESSE | 10.0 | 30.0 | 10.0 | 30.0 | 10.0 | 40.0 |
| APM | 0.1 | 0.3 | 0.1 | 0.3 | 0.1 | 0.3 |

| | EX. 81 | EX. 82 | EX. 83 | EX. 84 | EX. 85 | EX. 86 |
|---|---|---|---|---|---|---|
| GUM BASE | 25.5 | 25.5 | 25.5 | 25.5 | 25.5 | 25.5 |
| GLYCERIN | 7.9 | 7.7 | 7.9 | 7.7 | 7.7 | 4.7 |
| SORBITOL | 32.0 | 7.0 | 22.0 | 5.0 | 5.0 | — |
| MANNITOL | 8.0 | 8.0 | 8.0 | — | — | — |
| SORBITOL LIQUID | 5.0 | — | — | — | — | — |
| LYCASIN HSH SYRUP | — | 5.0 | 5.0 | 5.0 | 10.0 | 10.0 |
| MALTITOL | — | 5.0 | — | — | — | — |
| XYLITOL | — | — | — | 15.0 | — | — |
| LACTITOL | 10.0 | 10.0 | 10.0 | — | — | — |
| PALATINIT | — | — | 10.0 | 10.0 | 25.0 | 18.0 |
| FLAVOR | 1.5 | 1.5 | 1.5 | 1.5 | 1.5 | 1.5 |
| LITESSE | 10.0 | 30.0 | 10.0 | 30.0 | 25.0 | 40.0 |
| APM | 0.1 | 0.3 | 0.1 | 0.3 | 0.3 | 0.3 |

Any of the alditols can be combined with polydextrose and co-dried to form unique combinations, such as:

EXAMPLE 87

Litesse and sorbitol can be dissolved in water in a ratio of 2:1 sorbitol:Litesse and co-dried and used in formulas in Table 10.

EXAMPLE 88

Litesse, sorbitol and mannitol can be dissolved in water at a ratio of 1:1:1, co-dried, and used in appropriate formulas in Table 10.

EXAMPLE 89

Litesse, mannitol and xylitol can be dissolved in water at a ratio of 1:1:1, co-dried, and used in appropriate formulas in Table 10.

EXAMPLE 90

Litesse, sorbitol and lactitol can be dissolved in water at a ratio of 1:1:1, co-dried, and used in appropriate formulas in Table 10.

EXAMPLE 91

Litesse, palatinit and sorbitol can be dissolved in water at a ratio of 1:1:1, co-dried, and used in appropriate formulas in Table 10.

EXAMPLE 92

Litesse and palatinit can be dissolved in water at a ratio of 1:1, co-dried, and used in appropriate formulas in Table 10.

EXAMPLE 93

Litesse, sorbitol, maltitol and xylitol may be blended at 25% of each ingredient and dissolved in water, co-dried, and used in appropriate formulas in Table 10.

Multiple combinations of polydextrose with the various alditols can be made in solution to form liquid concentrates that do not need to be co-dried, such as:

EXAMPLE 94

Litesse, sorbitol, maltitol and Lycasin brand HSH syrup may be dissolved in water at 25% of each ingredient, evaporated to a thick syrup and used in the appropriate formulas in Table 10.

EXAMPLE 95

Litesse, xylitol, sorbitol and Lycasin brand HSH syrup can be dissolved in water at 25% of each ingredient, evaporated to a thick syrup and used in the formulas in Table 10.

EXAMPLE 96

Litesse, sorbitol, lactitol and Lycasin brand HSH syrup can be dissolved in water at 25% of each ingredient, evaporated to a thick syrup and used in the formulas in Table 10.

EXAMPLE 97

Litesse, Lycasin brand HSH syrup and glycerin can be dissolved in water at a ratio of 1:1:1, evaporated to a thick syrup and used in the formulas in Table 10.

EXAMPLE 98

Glycerin is added to Example 94 at a ratio of 4:1 syrup to glycerin, evaporated to a thick syrup and used in formulas in Table 10.

EXAMPLE 99

Glycerin is added to Example 95 at a ratio of 4:1 syrup to glycerin, evaporated to a thick syrup and used in the formulas in Table 10.

EXAMPLE 100

Glycerin is added to Example 96 at a ratio of 4:1 syrup to glycerin, evaporated to a thick syrup and used in formulas in Table 10.

Other high-intensity sweeteners such as acesulfame K, or the salts of acesulfame, cyclamate and its salts, saccharin and its salts, alitame, sucralose, thaumatin, monellin, dihydrochalcones, stevioside, glycyrrhizin, and combinations thereof may be used in any of the Examples listed in Tables 3, 4, 5, 6, 7, 8, 9 and 10. Since polydextrose has less sweetness than some of the sugars used in sugar gum, and some of the alditols in sugar-free gum, a high-intensity sweetener may be need to obtain the proper level of sweetness.

High-intensity sweeteners may also be modified to control their release in chewing gum formulations containing polydextrose. This can be controlled by various methods of encapsulation, agglomeration, absorption, or a combination of methods to obtain either a fast or slow release of the sweetener. Sweetener combinations, some of which may be synergistic, may also be included in the gum formulations containing polydextrose. Polydextrose may also be used to encapsulate, agglomerate, absorb or entrap any high intensity sweetener to control its release.

The following examples show the use of high-intensity sweeteners in chewing gum formulations with polydextrose.

EXAMPLE 101

Alitame at a level of 0.03% may be added to any of the formulas in Tables 3 through 10 by replacing 0.03% of the Litesse.

EXAMPLE 102

Sucralose at a level of 0.07% may be added to any of the formulas in Tables 3 through 10 by replacing 0.07% of the Litesse.

EXAMPLE 103

Thaumatin at a level of 0.02% may be added to any of the formulas in Tables 3 through 10 by replacing 0.02% of the Litesse.

EXAMPLE 104

Glycyrrhizin at a level of 0.4% may be added to any of the formulas in Tables 3 through 10 by replacing 0.4% of the Litesse.

High-intensity sweeteners may also be combined with other high-intensity sweeteners, with or without encapsulation, agglomeration or absorption, and used in chewing gums of the present invention. Examples are:

EXAMPLE 105

Aspartame and acesulfame K at a 1:1 ratio may be added to any of the formulas in Tables 3 through 10 at a level of 0.15% by replacing 0.15% of the Litesse.

EXAMPLE 106

Aspartame and alitame at a ratio of 9:1 aspartame: alitame may be added to any of the formulas in Tables 3 through 10 at a level of 0.1% by replacing 0.1% of the Litesse.

EXAMPLE 107

Aspartame and thaumatin at a ratio of 9:1 aspartame:thaumatin can be added to any of the formulas in Tables 3 through 10 at a level of 0.1% by replacing 0.1% of the Litesse.

EXAMPLE 108

Sucralose and alitame in a ratio of 3:1 sucralose: alitame can be added to any of the formulas in Tables 3 through 10 at a level of 0.05% by replacing 0.05% of the Litesse.

EXAMPLE 109

Alitame and glycyrrhizin in a ratio of 1:12 alitame:glycyrrhizin can be added to any of the formulas in Tables 3 through 10 at a level of 0.1% by replacing 0.1% of the Litesse.

EXAMPLE 110

Aspartame and glycyrrhizin in a ratio of 1:14 aspartame:glycyrrhizin can be added to any of the formulas in Tables 3 through 10 at a level of 0.3% by replacing 0.3% of the Litesse.

As discussed above, the various types of polydextrose ingredients that are available are polydextrose A, polydextrose K, polydextrose N 70% syrup and Litesse brand polydextrose. These materials may be used as the exclusive bulk sweetener in a variety of chewing gum formulations, as in Tables 11 and 12. The formulas with polydextrose and APM will show improved APM stability.

TABLE 11

|  | EX. 111 | EX. 112 | EX. 113 | EX. 114 | EX. 115 |
| --- | --- | --- | --- | --- | --- |
| GUM BASE | 19.2 | 25.5 | 25.5 | 25.5 | 40.0 |
| GLYCERIN | 2.0 | 2.0 | 7.0 | 10.0 | 2.0 |
| LITESSE | 57.8 | 51.0 | 51.0 | 53.0 | 40.5 |
| LITESSE SYRUP | 20.0 | 20.0 | 15.0 | 10.0 | 15.0 |
| FLAVOR | 1.0 | 1.5 | 1.5 | 1.5 | 2.5 |

Litesse powder or syrup may also be preblended with glycerin and coevaporated to reduce moisture.

TABLE 12

|  | EX. 116 | EX. 117 | EX. 118 | EX. 119 | EX. 120 | EX. 121 | EX. 122 |
| --- | --- | --- | --- | --- | --- | --- | --- |
| GUM BASE | 25.5 | 25.5 | 25.5 | 25.5 | 30.0 | 70.0 | 25.5 |
| GLYCERIN | 2.0 | 4.0 | 7.0 | 15.0 | 1.0 | 1.0 | — |
| LITESSE POWDER | 56.0 | 54.0 | 51.0 | 48.0 | 39.5 | 26.0 | 73.0 |
| LITESSE SYRUP | 15.0 | 15.0 | 15.0 | 10.0 | 6.0 | — | — |
| FLAVOR | 1.5 | 1.5 | 1.5 | 1.5 | 2.5 | 3.0 | 1.5 |

The formulations in Tables 11 and 12 do not contain other sugars or alditols. These formulations will give unique texture and flavor attributes. These formulations may also contain high-intensity, artificial sweeteners, from about 0.02% to about 0.1% for sweeteners like alitame, thaumatin and dihydrochalcones, and from about 0.1% to about 0.3% for sweeteners like aspartame, sucralose, acesulfame and saccharin. The formulations in Tables 11 and 12, without the other types of sugars and alditols, will also have good non-cariogenic and low caloric properties.

Polydextrose may also be co-dried with high intensity, artificial sweeteners by spray drying, fluid bed coating, spray congealing or agglomeration, and used in the formulations in Tables 11 and 12 at active levels of the various high intensity sweeteners noted above.

EXAMPLES 123–126

The following gum formulations were made:

|  | EX. 123 | EX. 124 | EX. 125 | EX. 126 |
| --- | --- | --- | --- | --- |
| BASE | 27.0 | 27.0 | 27.0 | 27.0 |
| SORBITOL | 40.2 | 38.7 | 32.5 | 20.9 |
| MANNITOL | 12.0 | 11.5 | 9.7 | 6.3 |
| GLYCERIN | 8.1 | 8.1 | 8.1 | 8.1 |
| SORBITOL LIQUID | 11.0 | 11.0 | 11.0 | 11.0 |
| PEPPERMINT FLAVOR | 1.3 | 1.3 | 1.3 | 1.3 |
| COLOR | 0.1 | 0.1 | 0.1 | 0.1 |
| APM | 0.3 | 0.3 | 0.3 | 0.3 |

|  | EX. 123 | EX. 124 | EX. 125 | EX. 126 |
|---|---|---|---|---|
| LITESSE POWDER | 0 | 2.0 | 10.0 | 25.0 |

These formulas were made in a conventional lab mixer in a conventional manner on a lab scale and formed into square pellets. Samples of each formula were placed in six sealed pouches and stored at 85° F. for 0, 1, 2, 4, 6 and 8 weeks. Samples were then removed and analyzed for APM to determine degradation. The test results are shown in FIG. 1. As shown, after eight weeks of storage at 85° F., at levels of 10% or greater of polydextrose, there was a significant increase in the stability of APM. At 10% polydextrose (Example 125), there was over a 10% increase in the amount of APM remaining after eight weeks of storage compared to the sample with no polydextrose (Example 123).

EXAMPLES 127–133

The following gum formulations were made:

|  | EX. 127 | EX. 128 | EX. 129 | EX. 130 | EX. 131 | EX. 132 | EX. 133 |
|---|---|---|---|---|---|---|---|
| BASE | 24.7 | 24.7 | 24.7 | 24.7 | 24.7 | 24.7 | 24.7 |
| SORBITOL | 50.0 | 50.0 | 45.0 | 35.0 | 10.0 | 35.0 | 10.0 |
| MANNITOL | 9.4 | 7.0 | 9.4 | 9.4 | 9.4 | 7.0 | 7.0 |
| GLYCERIN | 2.0 | 2.0 | 2.0 | 2.0 | 2.0 | 2.0 | 2.0 |
| LECITHIN | 0.2 | 0.2 | 0.2 | 0.2 | 0.2 | 0.2 | 0.2 |
| PEPPERMINT FLAVOR | 1.4 | 1.4 | 1.4 | 1.4 | 1.4 | 1.4 | 1.4 |
| APM | 0.3 | 0.3 | 0.3 | 0.3 | 0.3 | 0.3 | 0.3 |
| LYCASIN | — | 14.4 | — | — | — | 14.4 | 14.4 |
| SORBITOL LIQUID | 12.0 | — | 12.0 | 12.0 | 12.0 | — | — |
| LITESSE | — | — | 5.0 | 15.0 | 40.0 | 15.0 | 40.0 |

Figure 2:
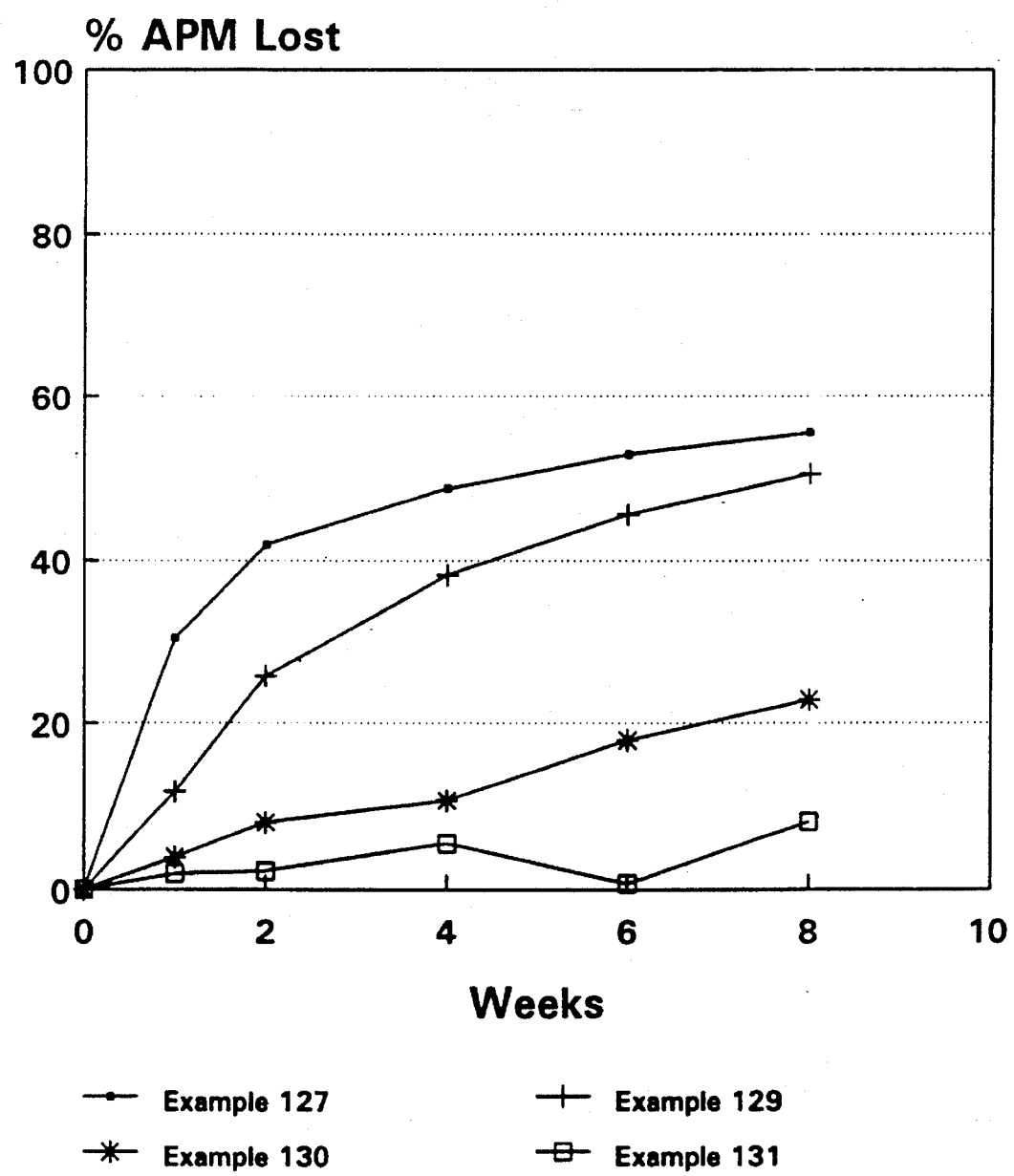
FIG. 2 shows test results of aspartame stability for gum made with sorbitol liquid and polydextrose.
Figure 3:
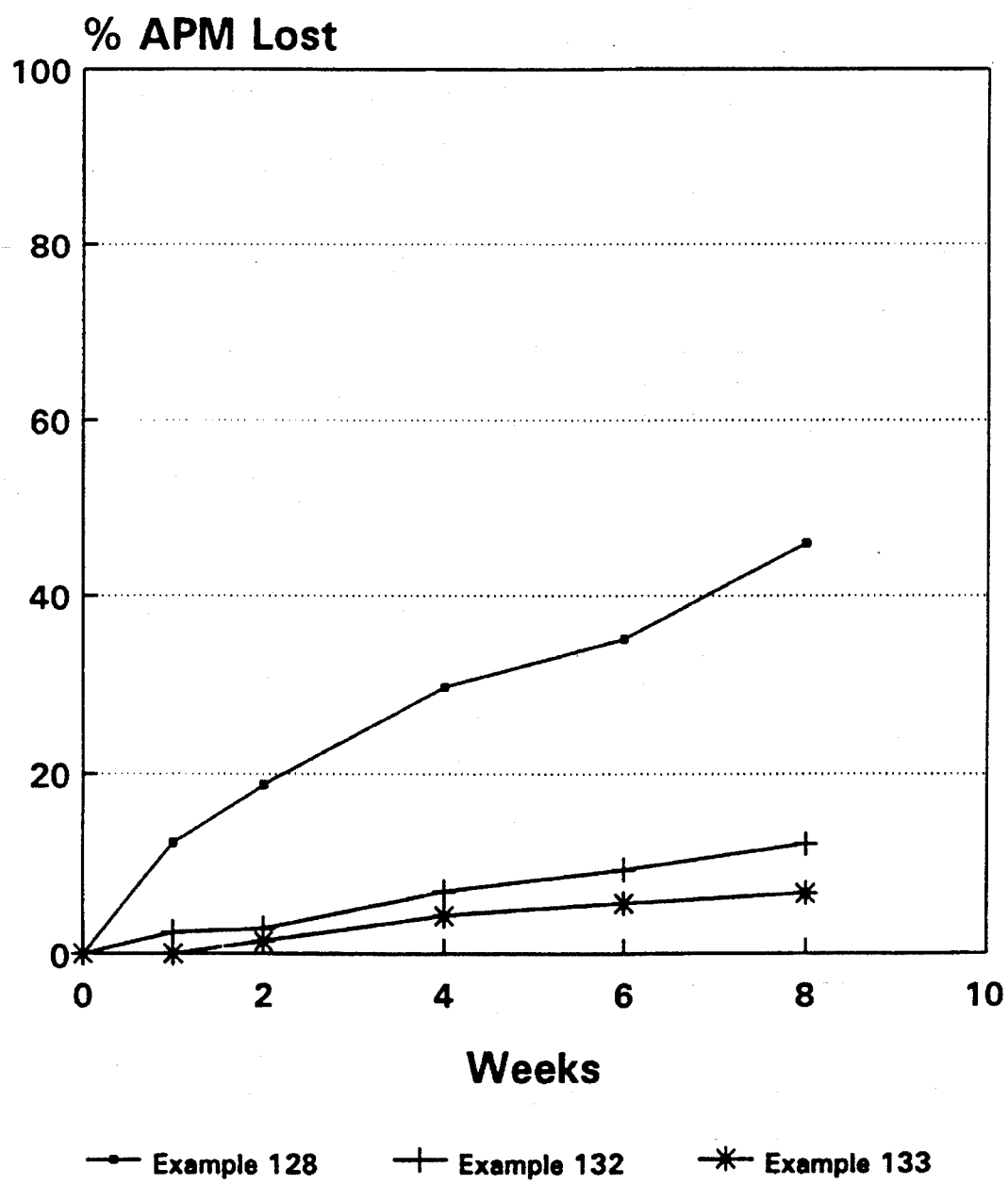
FIG. 3 shows test results of aspartame stability for gum made with Lycasin brand HSH syrup and polydextrose.

These formulas were made in a conventional lab mixer in a conventional manner and formed into square pellets. Samples of each formula were placed in six sealed pouches and stored at 85° F. for 0, 1, 2, 4, 6 and 8 weeks. Samples were then removed and analyzed for APM to determine degradation. The test results for Examples 127, 129, 130 and 131 are shown in FIG. 2 for gum made with sorbitol liquid, and the test results for Examples 128, 132 and 133 are shown in FIG. 3 for gum made with Lycasin brand HSH syrup. Results show that in both types of formulations, polydextrose improves APM stability significantly as compared to when a polydextrose material is not used. As seen in both FIGS. 2 and 3, after eight weeks of storage at 85° F., there was more than a 5% decrease in the amount of aspartame that decomposed in the gum formulas that includes polydextrose. Also, Examples 130, 132, and 133 produced a gum composition in which the polydextrose were effective such that after eight weeks of storage, over 80% of the unencapsulated aspartame originally formulated in the gum composition remained undecomposed.

EXAMPLES 134–141

The following gum formulations were made:

|  | EX. 134 | EX. 135 | EX. 136 | EX. 137 | EX. 138 | EX. 139 | EX. 140 | EX. 141 |
|---|---|---|---|---|---|---|---|---|
| BASE | 24.7 | 24.7 | 24.7 | 24.7 | 24.7 | 24.7 | 24.7 | 24.7 |
| SORBITOL | 35.0 | 50.0 | 35.0 | 50.0 | 35.0 | 50.0 | 35.0 | 50.0 |
| MANNITOL | 9.4 | 9.4 | 9.4 | 9.4 | 9.4 | 9.4 | 9.4 | 9.4 |
| GLYCERIN | 2.0 | 2.0 | 5.0 | 5.0 | 8.0 | 8.0 | 11.0 | 11.0 |
| LECITHIN | 0.2 | 0.2 | 0.2 | 0.2 | 0.2 | 0.2 | 0.2 | 0.2 |
| PEPPERMINT FLAVOR | 1.4 | 1.4 | 1.4 | 1.4 | 1.4 | 1.4 | 1.4 | 1.4 |
| APM | 0.3 | 0.3 | 0.3 | 0.3 | 0.3 | 0.3 | 0.3 | 0.3 |
| SORBITOL LIQUID | 12.0 | 12.0 | 9.0 | 9.0 | 6.0 | 6.0 | 3.0 | 3.0 |
| LITESSE | 15.0 | — | 15.0 | — | 15.0 | — | 15.0 | — |

Figure 4:
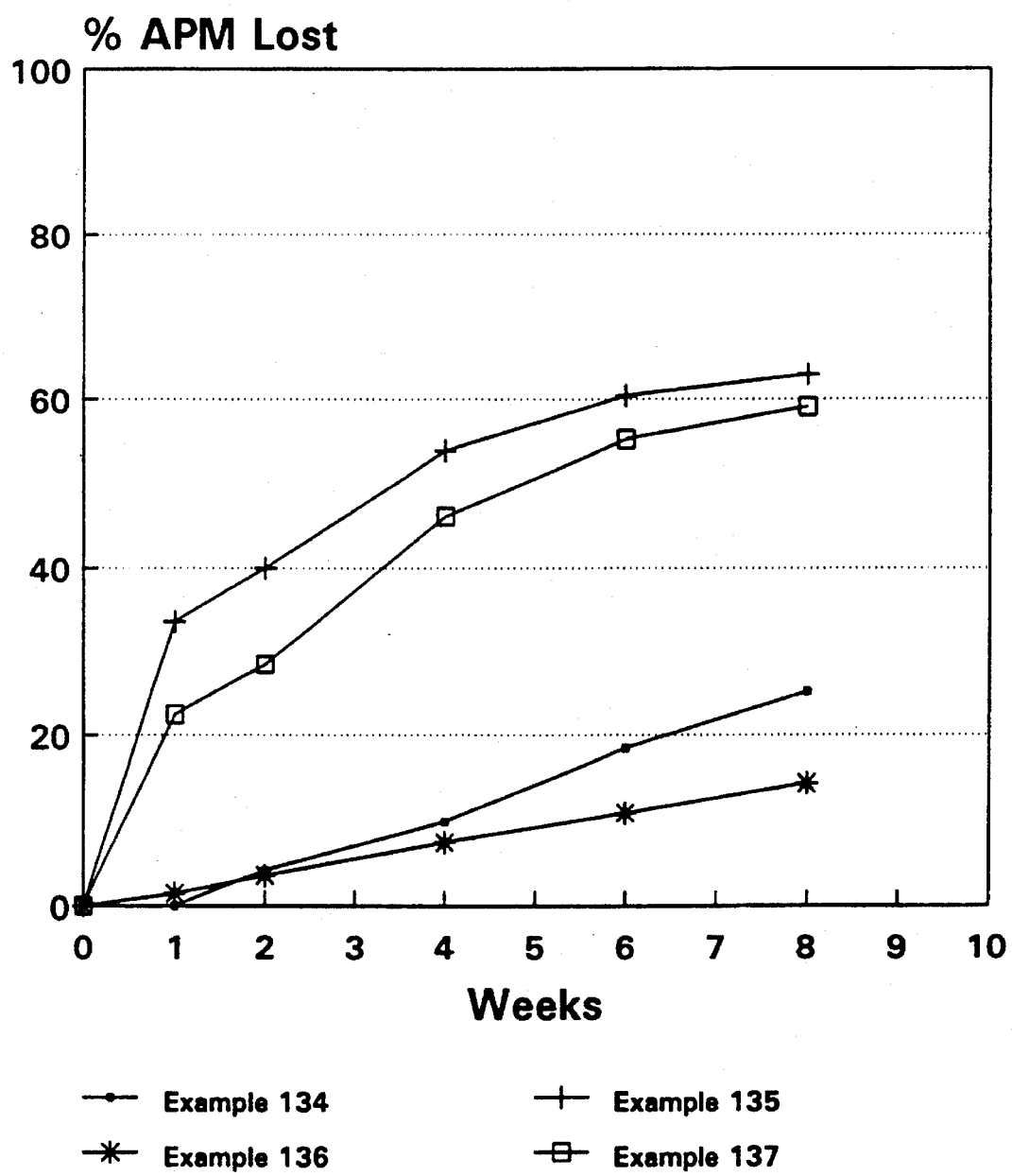
FIG. 4 shows test results of aspartame stability for gum made with sorbitol liquid, with and without polydextrose.
Figure 5:
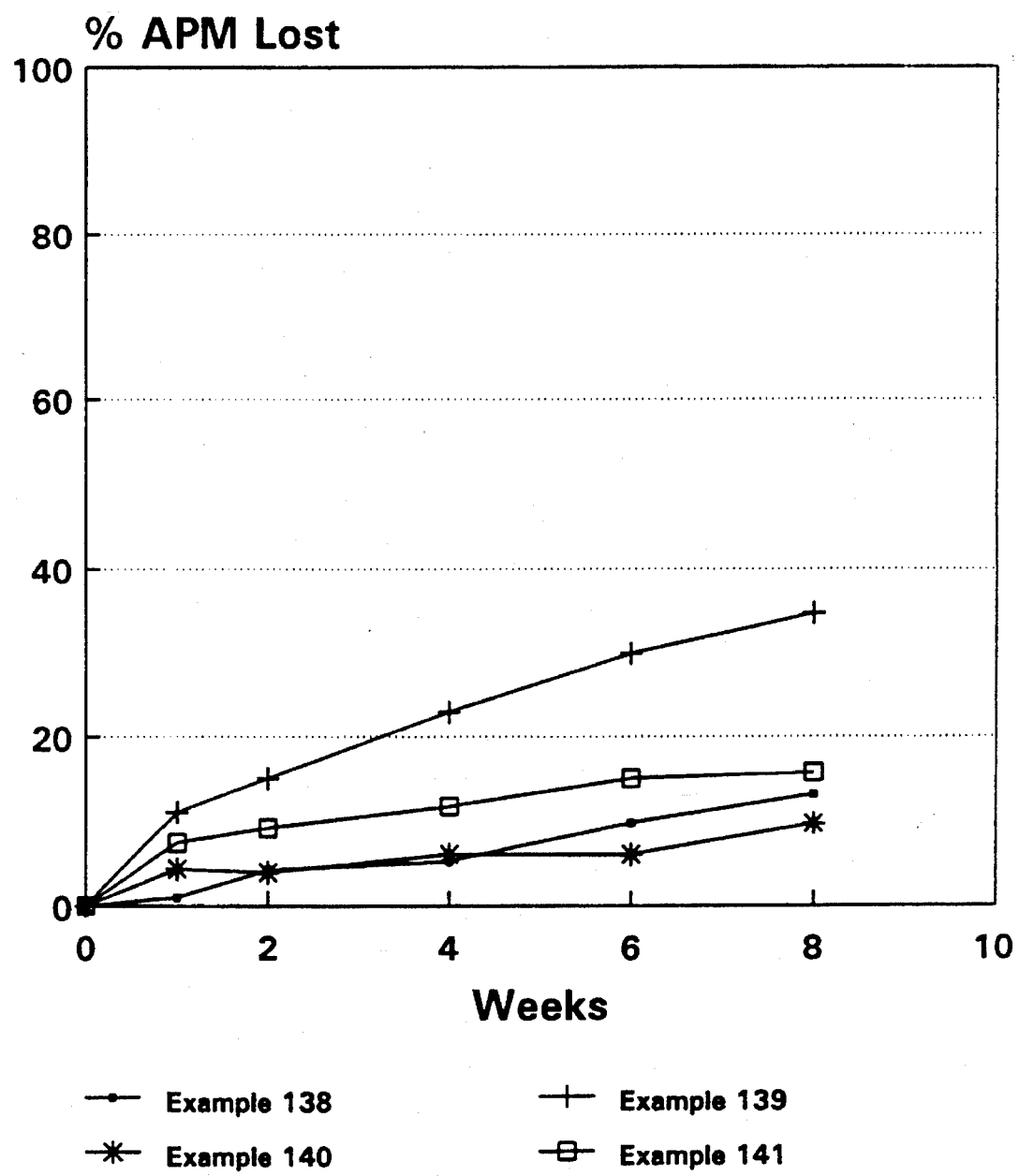
FIG. 5 shows test results of aspartame stability for gum made with sorbitol liquid, with and without polydextrose.

These formulas were made in a conventional lab mixer in a conventional manner and formed into square pellets. Samples of each formula were placed in six sealed pouches and stored at 85° F. for 0, 1, 2, 4, 6, and 8 weeks. Samples were then removed and analyzed for APM to determine degradation. The test results are shown in FIG. 4 for Examples 134–137 and FIG. 5 for Examples 138–141.

For each of the different levels of sorbitol liquid used (12%, 9%, 6% and 3%), it is shown that 15% Litesse improves APM stability. Compare Examples 134 vs. 135, 136 vs. 137, 138 vs. 139, 140 vs. 141. However, stability improvement decreases with lower levels of moisture in the gum formula. Approximate moisture levels, mostly from sorbitol liquid (containing 30% water), are:
Examples 134–135—4%
Examples 136–137—3%
Examples 138–139—2%
Examples 140–141—1%
However, even with as low as 1% moisture in a gum formula (Examples 140 and 141), APM stability is improved by about a 50% reduction in degradation due to the addition of powdered polydextrose.

EXAMPLE 142

The following sugar gum center formulation was made:

|  | % |
|---|---|
| Base | 24.8 |
| Sugar | 52.0 |
| Corn Syrup | 22.4 |
| Peppermint Flavor | 0.8 |
|  | 100 |

This formulation was made in a 25 gallon standard gum mixer and sheeted as rectangular pellets for coating tests.

Two sugar solutions were prepared for use in coating tests. They are:
A) 750 grams sugar
250 grams water
30 grams Litesse
B) 650 grams sugar
350 grams water
In a 12 inch lab coating pan, 1,000 grams of the above centers were coated with Solution A up to a level of 20% coating, then coating continued with Solution B until a 33% coating was achieved. As coating progressed, ten pieces were weighed to determine the coating weight increase to 20%, then 33%. During the coating process, Solution A was tacky like other types of coatings which contain gum arabic, maltodextrins or modified starches, but it is anticipated that polydextrose will give good shelf life protection.

The final coated product had a hard, crunchy shell that was off-white in color. The flavor had a creamy character, comparable to typical sugar coated pellet gum.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is therefore indicated by the appended claims rather than by the foregoing description. All changes which come within the meaning and range of equivalency of the claims are to be embraced within their scope.

We claim:

1. A chewing gum composition comprising a high-intensity sweetener encapsulated with polydextrose.

2. A chewing gum composition comprising a flavor encapsulated with polydextrose.

3. The chewing gum composition as in any one of claims 1–2 wherein the polydextrose is in the form of polydextrose A, polydextrose K, polydextrose N 70% syrup, polydextrose with reduced citric acid and improved taste and mixtures thereof.

4. A chewing gum product having a rolling compound thereon, the rolling compound comprising polydextrose.

5. The chewing gum product of claim 4 wherein the polydextrose comprises from about 0.5% to 100% of the rolling compound.

6. The chewing gum product of claim 4 wherein the polydextrose comprises from about 0.005% to about 5% of the chewing gum product.

7. A hard-shell coated chewing gum product comprising a gum pellet coated with a hard-shell coating comprising polydextrose.

8. The hard-shell coated chewing gum product of claim 7 wherein the polydextrose comprises about 0.1% to about 20% of the coating.

9. The hard-shell coated chewing gum product of claim 7 wherein the coating further comprises a material selected from the group consisting of sucrose, dextrose, maltose, xylitol, lactitol, palatinit and mixtures thereof.

10. A chewing gum product having a liquid center wherein the liquid center comprises polydextrose.

11. The chewing gum product as in any one of claims 4–11 wherein the polydextrose is in the form of polydextrose A, polydextrose K, polydextrose N 70% syrup, polydextrose with reduced citric acid and improved taste and mixtures thereof.

12. A method of making a hard-shell coated chewing gum product comprising the steps of:
   a) providing a gum pellet;
   b) applying a liquid coating syrup to the surface of the gum pellet, the coating syrup comprising polydextrose, and
   c) solidifying the coating syrup to form a hard-shell coating.

13. The method of claim 12 wherein the coating syrup comprises a solution and the step of solidifying the coating comprises drying the solution.

14. The method of claim 12 wherein the coating syrup is applied in successive layers, with each layer of syrup being dried before application of an additional layer.

15. The method of claim 14 wherein a powdered coating is applied after one or more of the syrup layers is applied.

16. The method of claim 15 wherein the powdered coating comprises polydextrose, maltodextrin, gelatin, cellulose derivative, starch, modified starch, vegetable gum, filler and mixtures thereof.

17. A method of making chewing gum comprising the steps of:
   a) co-drying a solution containing polydextrose and another sweetener selected from the group consisting of sugar sweeteners, alditol sweeteners and high-intensity sweeteners, and
   b) mixing the co-dried polydextrose sweetener with gum base and flavoring agents to produce a gum composition.

18. A method of making chewing gum comprising the steps of:
   a) co-evaporating an aqueous solution comprising polydextrose and a plasticizing agent to form a syrup, and
   b) mixing the syrup with gum base, bulking agents and flavoring agents to produce a gum composition.

19. The method as in any one of claims 11–18 wherein the polydextrose is in the form of polydextrose A, polydextrose K, polydextrose N 70% syrup, polydextrose with reduced citric acid and improved taste and mixtures thereof.

20. The chewing gum composition of claim 1 wherein the polydextrose is in the form of an aqueous syrup.

21. The method of claim 15 wherein the product is non-cariogenic.

22. The method of claim 15 wherein the product is free of polyols.

23. The method of claim 21 wherein the plasticizing agent is selected from the group consisting of glycerin, propylene glycol and mixtures thereof.

* * * * *

UNITED STATES PATENT AND TRADEMARK OFFICE
CERTIFICATE OF CORRECTION

PATENT NO. : 5,525,360
DATED : June 11, 1996
INVENTOR(S) : Robert J. Yatka, et al It is certified that error appears in the above-identified patent and that said Letters Patent is hereby corrected as shown below:

In column 1, line 8, replace "91/09631" with --PCT/US91/09631--.

In column 7, delete text starting at line 43 through line 67.

In column 8, delete text starting at line 1 through line 7.

In column 18, line 31, replace "30.0" with --50.0--.

In column 18, line 32, replace the first occurrence of "1.0" with --2.0--.

In the Claims

In Claim 11, line 2, replace "4-11" with --4-10--.

In Claim 23, line 1, replace "21" with --18--.

Signed and Sealed this

Twenty-third Day of March, 1999

Attest:

Q. TODD DICKINSON

*Attesting Officer*    *Acting Commissioner of Patents and Trademarks*